United States Patent [19]

Kabasawa et al.

[11] Patent Number: 5,631,541
[45] Date of Patent: May 20, 1997

[54] ELECTRONIC APPLIANCE, RECHARGING METHOD AND RECHARGING APPARATUS

[75] Inventors: Kenichi Kabasawa, Saitama, Japan; Lau S. Keang; Looi T. Chung, both of Penang, Malaysia; Shigeho Ogawa, Kanagawa, Japan

[73] Assignee: Sony Corporation, Tokyo, Japan

[21] Appl. No.: 415,332

[22] Filed: Apr. 3, 1995

[30]     Foreign Application Priority Data

Apr. 5, 1994 [JP] Japan ................... 6-089242

[51] Int. Cl.⁶ ..................................... H02J 7/00
[52] U.S. Cl. .................................... 320/31; 320/48
[58] Field of Search ................... 320/31, 19, 13, 320/21, 37, 38, 22, 48; 324/427, 428

[56]     References Cited

U.S. PATENT DOCUMENTS

| | | | |
|---|---|---|---|
| 4,286,204 | 8/1981 | Belot | 320/31 |
| 4,775,827 | 10/1988 | Ijntema et al. | 320/44 |
| 4,803,416 | 2/1989 | Abiven et al. | 320/44 |
| 4,952,862 | 8/1990 | Biagetti et al. | 320/48 |
| 5,329,239 | 7/1994 | Kindemann et al. | 324/678 |
| 5,341,084 | 8/1994 | Gotoh et al. | 320/44 |
| 5,394,089 | 2/1995 | Clegg | 324/427 |
| 5,430,363 | 7/1995 | Kim | 320/14 |

*Primary Examiner*—Peter S. Wong
*Assistant Examiner*—Gregory J. Toatley, Jr.
*Attorney, Agent, or Firm*—Jay H. Maioli

[57]     ABSTRACT

An electronic appliance such as a digital audio disk player in which either an external power source, or a secondary cell is employed as a power source, includes a signal reproducing unit, a recharging unit, a judging unit, a measuring unit, and a controller. To the signal reproducing unit, an operation power source voltage is applied from the external power source, or the secondary cell. The voltage from the external power source is applied to the recharging unit so as to recharge the secondary cell. The judging unit judges whether or not the voltage from the secondary cell is applied to the signal reproducing unit. The measuring unit measures a time period during which the voltage from the secondary cell is applied to the signal reproducing unit when the judgement result obtained from the judging unit indicates that the voltage from the secondary cell is applied. The controller sets a recharging time period based on the measurement value obtained from the measuring unit when the signal reproducing unit is under non-operation condition, and controls the recharging unit only for the set recharging time period, so that the recharging operation of the secondary cell is performed by the recharging unit.

16 Claims, 3 Drawing Sheets

ELECTRONIC APPLIANCE, RECHARGING METHOD AND RECHARGING APPARATUS

BACKGROUND OF THE INVENTION

1. Field of the Invention

The present invention generally relates to an electronic appliance, a recharging method, and a recharging apparatus. More specifically, the present invention is directed to an electronic appliance employing a secondary cell such as a rechargeable battery as a power source thereof, and a method/apparatus for recharging the secondary cell.

2. Background of the Invention

Usually, electronic appliances such as portable CD (compact disk) players and tape recorders use secondary cells, e.g., Ni-Cd batteries and Li-Ion batteries as power sources.

There are the below-mentioned recharging methods of recharging apparatus with respect to these secondary cells.

As the first recharging method, when a secondary cell is mounted on the recharging apparatus, the recharging operation to the secondary cell is commenced and also a time lapse is measured from the commencement of this recharging operation by the internal timer during the recharging operation. When a preselected time has passed after the recharging operation was commenced, this recharging operation is accomplished. In other words, according to this first recharging method, the recharging operation is carried out for a predetermined time period for the secondary cell connected to the recharging apparatus, irrelevant of the discharging conditions of this secondary cell.

In another conventional recharging method, a voltage of a secondary cell is detected during the recharging operation to acquire the end timing of this recharging operation. That is, according to the conventional recharging method, since the voltage of the secondary cell is increased to a certain peak voltage and thereafter becomes stable at a voltage lower than the peak voltage by ΔV, this voltage variation is detected and used to stop this recharging operation.

However, these conventional recharging methods have the following problems.

In the first recharging method for continuously performing the recharging operation for a predetermined time, there are some possibilities that the secondary cell set to the recharging apparatus is recharged for a predetermined time even when this secondary cell has not been fully discharged. This first recharging method may produce such a problem that the secondary cell is readily brought into the overcharging state. If the secondary cell is brought into the overcharging state, then the recharging cycle lifetime of the secondary cell is lowered.

To prevent such an overcharging state in the first recharging operation, a so-called "trickle charging" operation is acceptable, whereby the recharging operation is carried out under low currents and for a long time period. However, in the case of the execution of this trickle charging operation, a lengthy charging time is necessarily required. As a result, when the secondary cell is quickly wanted for use, this secondary cell and the electronic appliance using this secondary cell cannot be utilized until the trickle charging operation is completed.

In the latter recharging method where the voltage drop from the peak voltage by ΔV is detected to obtain the recharging operation stop timing, the above-described overcharging state may be prevented. However, since the various control circuits for detecting the voltages of the secondary cell and for controlling the cell based on the detected voltage required, the hardware construction would become complex, and the manufacturing cost of the recharging apparatus would be increased, and further a bulky recharging apparatus would be constructed. Specifically, this second recharging method may cause such a serious problem when the recharging apparatus operated under the second recharging method attempted to be assembled into a compact portable electronic appliance.

Furthermore, when the more correct recharging operation is realized while preventing the secondary cell from being overcharged, not only the voltage detection at the terminal voltage of the secondary cell is required, but also the temperature/recharging current detections of this secondary cell are required. As a consequence, the overall circuit arrangement of such a recharging apparatus would be more complex.

SUMMARY OF THE INVENTION

It is therefore an object of the present invention to provide a recharging apparatus which can solve the above-mentioned problems.

It is another object of the present invention to provide an electronic appliance which can solve the above-described problems.

It is a further object of the present invention to provide a recharging method capable of solving the above-identified problems.

According to an aspect of the present invention, there is provided a recharging apparatus for recharging a secondary cell which may supply a power source voltage to a load. The recharging apparatus includes a recharging unit, a judging unit, a measuring unit and a control unit. The recharging unit recharges the secondary cell. The judging unit judges whether or not the voltage from the secondary cell is applied to the load. The measuring unit measures a time period during which the voltage from the secondary cell is applied to the load when the judging result obtained from the judging unit indicates that the voltage from the secondary cell is applied to the load. The control unit sets the recharging time based on the measurement result by the measuring unit and controls the recharging unit only for the set recharging time to recharge the secondary cell by the recharging unit.

According to another aspect of the present invention, there is provided an electronic appliance for employing either an external power source, or a secondary cell as a power source. The electronic appliance includes a signal reproducing unit, a recharging unit, a judging unit, a measuring unit, and a controller. The signal recharging unit is supplied with a power source voltage derived from the external power source or the secondary cell. The voltage from the external power source is applied to the recharging unit so as to recharge the secondary cell. The judging unit judges whether or not the voltage derived from the secondary cell is applied to the signal reproducing unit. The measuring unit measures a time period during which the voltage from the secondary cell is applied to a signal processing unit when the judgement result of the judging unit indicates that the voltage from the secondary cell is applied to the signal reproducing unit. The controller sets a recharging time based upon the measurement value of the measuring unit under such a condition that the signal reproducing unit is not operated, and controls the recharging unit only for the set recharging time, so that the secondary cell is recharged by the recharging unit.

According to a further aspect of the present invention, there is provided a recharging method for recharging a secondary cell which may apply a power source voltage to a load. In the recharging method, a judgement is made as to whether or not the voltage from the secondary cell is applied to the load, and when the judgement result indicates that the voltage derived from the secondary cell is applied to the load, a measurement is made of a time period during which the voltage from the secondary cell is applied to the load. Based on the measurement result, the recharging time is set, and the secondary cell is recharged only during the set recharging time under such conditions that no voltage from the secondary cell is applied to the load and also is rechargeable.

In accordance with the present invention, the measurement is made of the time period during which the operation voltage is applied from the secondary cell to the load. When the secondary cell is brought into the rechargeable state, the recharging time is set based on the measured time period and then the secondary cell is recharged only during the set recharging time. As a result, the proper recharging operation can be achieved without detecting the terminal voltage of the secondary cell, the charge/discharge currents thereof, and the temperatures thereof and the overcharging operation is not performed. Since it is not required to detect the terminal voltages, charge/discharge currents and temperatures of the secondary cell, the recharging apparatus can be made simple, at low cost and compact.

BRIEF DESCRIPTION OF THE DRAWINGS

The present invention may be understood with reference to the accompanying drawings, in which.

DETAILED DESCRIPTION OF THE INVENTION

Figure 1:
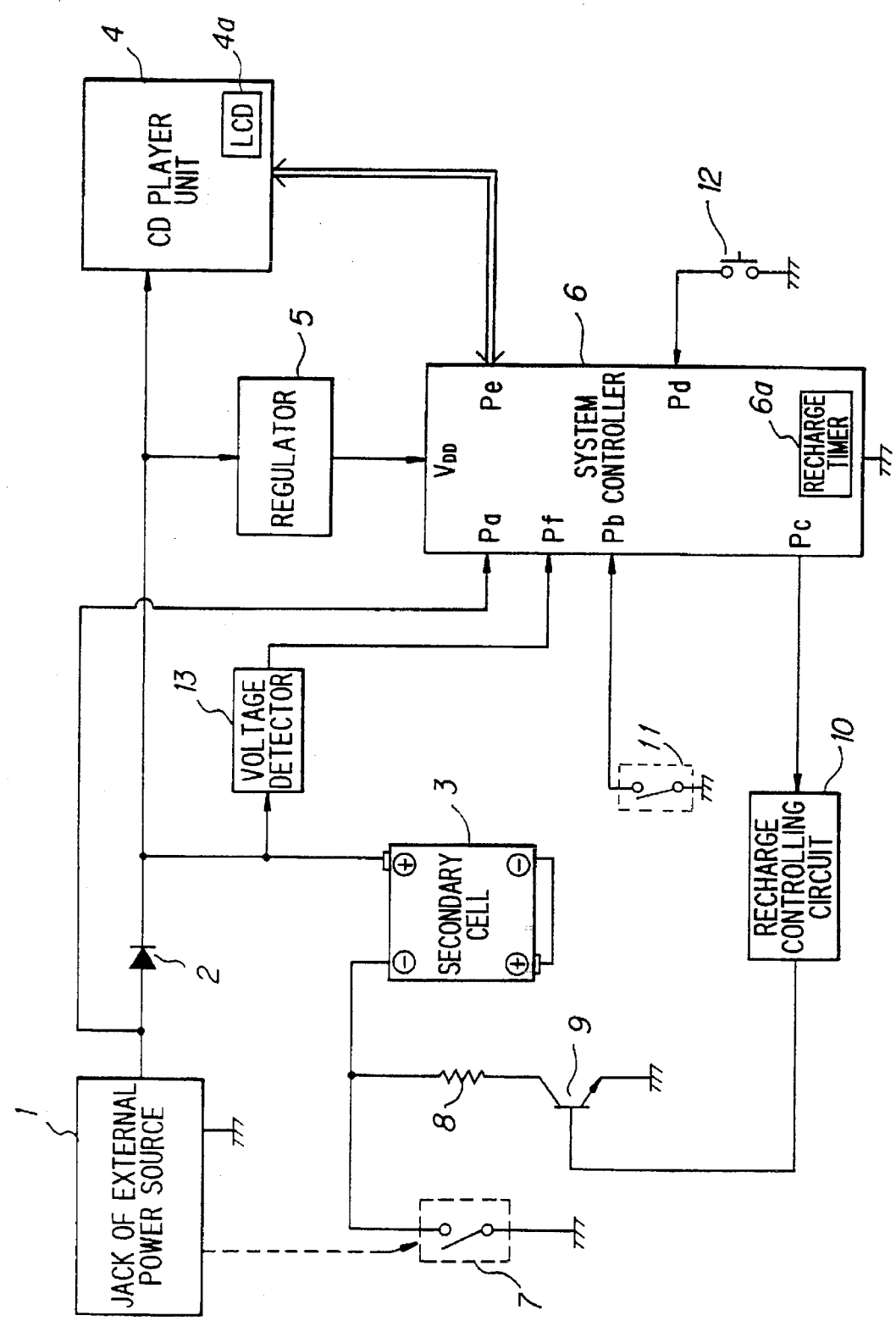
FIG. 1 is a schematic block diagram for indicating a major circuit portion of a compact disk player employing a recharging apparatus according to an embodiment of the present invention.

Before describing a concrete embodiment of the present invention, a basic idea of the present invention will now be explained.

If a measurement is made of a time period during which a circuit unit functioning as a load is operated with employment of a secondary cell as a power source, namely a discharge time period of the secondary cell is measured, it is possible to a discharge amount of this secondary cell to some extent. Based upon the measurement discharge time period, a proper recharging time period can be calculated.

In other words, assuming now that a constant discharge current is supplied from the secondary cell during the operation of the circuit unit functioning as the load, and also a constant recharge current is supplied to the secondary cell during the recharging operation, a proper recharge time period may be calculated based on the measured value of this discharge time period:

Assuming that:
Id [mA]—average discharge current during operation of circuit unit, i.e., load;
Ic [mA]—average recharging current during recharging operation;
Td [hour]—operation time (discharge time) of circuit unit, i.e., load; and
Tc [hour]—recharging time,
it can be satisfied as follows:

$$Tc \times Ic = k \times Td \times Id \quad (1).$$

It should be noted that symbol "K" denotes a coefficient capable of absorbing fluctuations in the recharging efficiency of the secondary cell, Id and Ic. When this coefficient K becomes too large, lengthy recharging time Tc is required so that overcharge will occur. When this coefficient K becomes too small, short recharging operation will occur. Thus, this coefficient K should be selected to be such a proper value, depending upon capabilities of the secondary cell and designs of the circuit unit, i.e., the load.

When the formula (1) is modified with respect to the recharging time Tc, it is given:

$$Tc = [(k \times Id)/Ic] \times Td \quad (2).$$

That is, if the operation time Td of the circuit unit functioning as the load is measured, then the recharging time Tc can be obtained.

When the capacity of the secondary cell is selected to be A [mA×hour] and an n [%] of A corresponds to the maximum recharging amount, the following relationship can be established:

$$Tc \leq A \times (n/100) \times (1/Ic) = Tc_{MAX} \quad (3).$$

In other words, while the maximum recharging time is set as $Tc_{MAX}$, the recharging time is limited to prevent the overcharge.

As described above, when the recharging operation is carried out by setting the recharging time of the secondary cell, in the case that this recharging time is shorter than a predetermined time, namely substantially no discharge current is supplied from the secondary cell, no recharging operation is carried out. As a result, a so-called "shallow" charge/discharge operation which is repeated and which is not proper to the secondary cell, can be avoided. That is, this shallow charge/discharge operation is performed in such a manner that the discharge time period of the secondary cell is short and therefore the short recharging operaLion is carried out in order to compensate for the voltage drop caused by this short discharge time period.

A recharging apparatus according to the present invention will now be described in detail with reference to the drawings. It should be noted that the below-mentioned recharging apparatus is mounted on, for example, such an electronic appliance as a portable digital audio disk player, e.g., a compact disk player.

FIG. 1 is a schematic block diagram for showing a major portion of a compact disk player containing the recharging apparatus. In FIG. 1, reference numeral 1 represents an external power source's jack to which an adaptor for converting the commercial AC voltage into a predetermined DC voltage (will be referred to an "AC adaptor" hereinafter) is connected. The AC adaptor connected to the home-use AC power source is connected to the jack 1 of the external power source, so that the DC source voltage is applied via a diode 2 to a CD player unit 4. That is, a compact disk can be reproduced in the CD player unit 4 by using the home-use AC power source.

Reference numeral 3 shows a secondary cell which is recharged by the DC current supplied from the jack 1 of the external power source. As the secondary cell, an Ni—Cd cell or a lithium-ion cell may be employed.

Reference numeral 5 is a regulator, and reference numeral 6 shows a system controller constructed of a microcomputer. An operation power source voltage VDD is applied via the regulator S to the system controller 6 from the jack 1, or the secondary cell 3.

A switch 7 is switched in response to the connection condition of the AC adaptor to the jack 1 of the external power source jack 1. The switch 7 is turned OFF when the AC adaptor is connected to this jack 1, whereas the switch 7 is turned ON when the AC adaptor is not connected to the jack 1. In other words, when the AC adaptor is connected to the jack 1 of the external power source, no operation power source voltage is applied from the secondary cell 3 via this switch 7 to the CD player unit 4. Conversely, when the AC adaptor is not connected to this jack 1, the operation power source voltage is applied from the secondary cell 3 via the switch 7 to the CD player 4 and the system controller 6.

A resister 8 and a transistor 9 constitute a recharging circuit for recharging the secondary cell 3. When the AC adaptor is connected to the jack 1 of the external power source to turn OFF the switch 7, if the transistor 9 is made to conduct by a control current supplied from a recharging control circuit 10, then the secondary cell 3 is recharged by way of the recharging currents flowing through the secondary cell 3, the resistor 8, and the transistor 9 from the jack 1 functioning as the power source. This recharging operation is executed while the AC adaptor is connected to the jack 1, the DC power source voltage is applied from the home-use AC power source by this AC adaptor, and also the CD player unit 4 is not operated, namely under the stop condition.

Reference numeral 11 indicates a cell detecting switch whose contact is connected/disconnected, depending on such a condition whether or not the secondary cell 3 is mounted. Reference numeral 12 is an operation key for entering the reproducing operation performed in the CD player unit 4. It should be understood that although only a single switch, namely the operation key 12 connected to the system controller 6 is illustrated for the sake of easy understanding of the simplified circuit arrangement, actually, a plurality of operation switches are employed in connection with the required functions. The input signals derived from the respective operation keys are supplied to the system controller 6, and then the control signals produced in response to the operated keys are supplied from the system controller 6 to the CD player unit 4.

Also, reference numeral 13 is a voltage detecting circuit for detecting a charged amount of the secondary cell 3. This voltage detecting circuit 13 judges that when the terminal voltage of the secondary cell 3 is lower than a preselected voltage, this condition is considered as an empty condition. This voltage detecting circuit 13 is arranged by, for example, a comparator.

As an input of a port Pa of the system controller 6, the output derived from the jack 1 of the external power source is supplied. In response to the input of this port Pa, the system controller 6 can detect whether or not the AC adaptor is connected to the jack 1.

As an input of another port Pb of the system controller 6, the output signal from the cell detecting switch 11 is supplied to detect the condition of the switch 11. Based on the detected result, it is possible to detect whether or not the secondary cell 3 is mounted.

The system controller 6 supplies a recharge controlling signal as an output of another port Pc to the recharge controlling circuit 10. In response to the recharge controlling signal from the system controller 6, the recharge controlling circuit 10 applies a control current to the transistor 9 so as to recharge the secondary cell 3.

As an input to a further port Pd of the system controller 6, an input signal from the operation key 12 is supplied, and a control signal is produced based on the input signal derived from the operation key 12, so that the reproducing operation of the CD player unit 4 is controlled. Both of the controlling operations and the detecting operations of the various conditions of the CD player unit 4 are performed by supplying/receiving the signals between the CD player unit 4 and the system controller 6 via input/output of the port Pe (control 'bus').

The CD player unit 4 owns a display unit 4a. The display unit 4a is constructed by employing a liquid crystal display element and the like. The operation condition of the CD player unit 4 and the time information are displayed on this display unit 4a, so that the user can be informed. Also during the recharging operation, such an indication "under recharging state" is made on the display unit 4a.

As described above, additionally, in response to an input to a port PF of the system controller 6 the output of the voltage detecting circuit 13 is supplied, so that the system controller 6 can recognize as to whether or not the secondary cell 3 is under empty state.

A timer 6a is provided within the system controller 6. This timer 6a performs the count operation when no AC adaptor is connected to the jack 1 of the external power source and thus the CD player unit 4 is operated under power supply of the secondary cell 3, to thereby measure the operation time (namely, discharge time of secondary cell 3) of the CD player unit 4. Further, this timer 6a sets the recharge time when the AC adaptor is connected to the jack 1, and also the secondary cell 3 is recharged under such a condition that the CD player unit 4 is not operated.

A description will now be made of the recharging operation of the secondary cell 3 executed based on the measurement result about the operation time of the CD player unit 4 by the timer 6a with reference to FIG. 2.

This recharging operation is carried out based on the above-described formulae (1) to (3). In this embodiment, it is set as follows:

$K \times (Id/Ic) = 2$, and $Tc_{MAX} = 3$ hours.

In the timer 6a, "70000h" is set as an initial value, and the counting operation of 90000h stages up to "00000h" is performed, symbol "h" being added in order to indicate that it indicates hexadecimal. Symbol "70000h" corresponds to such a count value that the secondary cell 3 is under empty state, and symbol "00000h" corresponds to such a count value that the secondary cell 3 is completely recharged.

Figure 2:
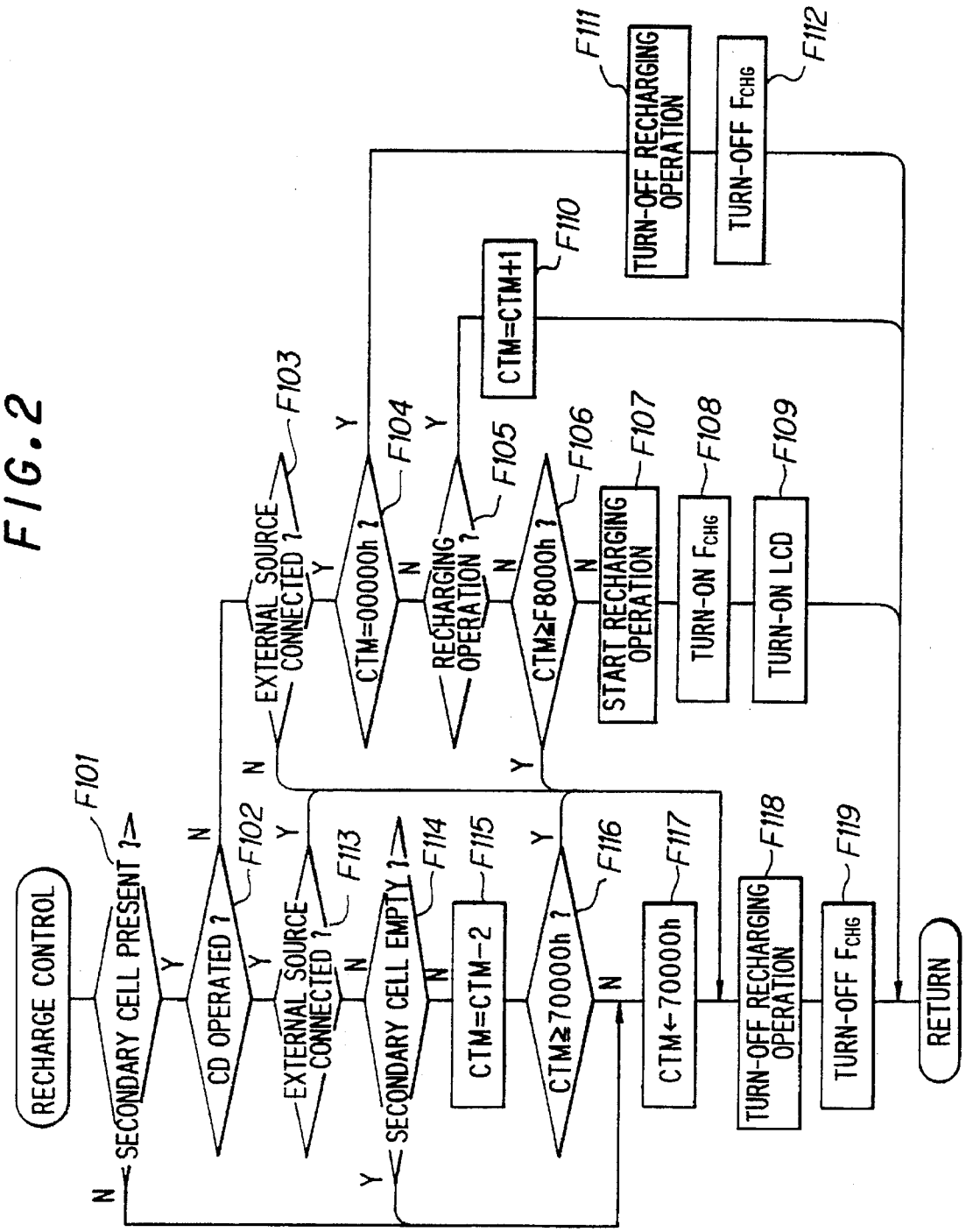
FIG. 2 is a flow chart for explaining a recharging control operation of a system controller employed in the recharging apparatus of FIG. 1.

It shoutd be noted that the task period of the flow chart shown in FIG. 2 is selected to be 18.3 msec. As a result, the time duration required to count 90000h times from "70000h" to "00000h" corresponds to 180 hours (=90000× 18.3 msec). In other words, such a recharging tinme duration is set to 3 hours, which is defined from the empty state to the full recharging state of the secondary cell in accordance with the capability of the secondary cell 3 and the recharging current amount.

As the recharging control process executed by the system controller, a check is done as to whether or not the secondary cell 3 is mounted on the compact disk player containing this recharging apparatus based on the condition of the port Pb of the system controller 6, namely the signal supplied from the switch 11 to this port Pb (step F101). When the secondary cell 3 is not yet mounted, the value 70000h is set as the count value CTM to the timer 6a, and this control process is accomplished without executing the recharging operation (flow steps from F101 via F117, F118 and F119 to return). It should be understood that when the secondary cell 3 is mounted, or this cell is substituted by another secondary cell, the count value 70000h is set as the initial value by this control process.

The system controller 6 judges whether or not the CD player unit 4 is under operating condition, e.g., reproducing operation based on the condition of the port Pb when the secondary cell has been mounted (step F102).

When the reproducing operation is not executed, the control process is advanced to the next step F103 at which another judgement is made as to whether or not the AC adaptor is connected to the jack 1 of the external power source, and the voltage from the external power source is applied to the compact disk player containing this recharging apparatus.

When no voltage is applied from the external power source to this compact disk player, since the secondary cell 3 cannot be recharged, this control process is ended (flow steps from F103 via F118 and F119 to return).

To the contrary, when it is so judged that the voltage from the external power source is applied to the compact disk player at the step F103, another check is made as to whether or not the count value CTM of the timer 6a is "00000h", namely whether or not the secondary cell 3 is fully recharged until its storage capacity (step F104).

If the count value CTM of the timer 6a is not equal to 00000h, namely the secondary cell 3 has not yet been recharged until its storage capacity by applying the voltage to the CD player unit 4, or the secondary cell 3 has been discharged from the predetermined condition, then a judgement is done as to whether or not the secondary cell is under recharging operation (step F105). Then, when the recharging operation is not executed, the recharging operation to the secondary cell 3 is commenced. At this time, a check is done as to whether or not the count value CTM of the timer 6a is larger than, or equal to F8000h, namely whether or not the count value CTM is equal to any one of F8000h to FFFFFh (step F106).

If the count value of the timer 6a is smaller than F8000h, namely is equal to any one of 70000h to F7ffffh, then the recharging operation to the secondary cell is commenced (step F107). The system controller 6 supplies the recharge controlling signal from the port Pc thereof to the recharge controlling circuit 10 so as to recharge the secondary cell 3.

The system controller 6 supplies a recharging flag $F_{CHG}$ to the CD player unit 4 via the port Pe in order that the display unit 4a displays "under recharging operation" (steps F108 and F109). The recharging flag $F_{CHG}$ corresponds to such a flag for causing, for instance, the display unit 4a to represent "under recharging state". During a time period when the recharging flag $F_{CHG}$ is ON, for example, such an indication "CHARGE ON" is made on the display unit 4a.

After the above-described recharging operation is commenced, the control process is advanced from a step F105 to a step F110, and the count value CTM of the timer 6a is incremented. For example, when the recharging operation is commenced under such a condition that CTM=70000h, this count value CTM is sequentially incremented from 70001h, 70002h, 70003h, every time the control process shown in FIG. 2 is executed at the task period of 18.3 msec.

When such a recharging operation is continued, the count value CTM becomes 00000h at a certain time instant. Then, the control process is advanced from the step F104 to a step F111 at which the output from the port Pc of the system controller 6 is supplied to the recharge controlling circuit 10 so that the recharging operation is ended. For example, when the recharging operation is commenced under such conditions that the secondary cell 3 is discharged and the count value CTM=70000h, the count value CTM becomes 00000h after 3 hours have passed. In other words, this secondary cell 3 has been completely recharged with its full capacity.

When the recharging operation is accomplished, the recharging flag $F_{CHG}$ supplied to the CD player unit 4 is turned OFF, so that such an indication "CHARGE ON" is erased from the display unit 4a. Alternatively, another indication "CHARGE OFF" indicative of the completion of this recharging operation may be made on the display unit 4a, instead of the above-described erasing of the indication.

On the other hand, when it is so judged at the step F102 that the CD player unit 4 is under operation, the control process is advanced to a step F113. At this step, a judgement is made as to whether or not the external power from the jack 1 of the external power source is supplied from the port 6a of the system controller 6 to the CD player unit 4.

When the external power is supplied to the CD player unit 4, namely the secondary cell 3 is not used as the power source for this CD player unit 4, but the secondary cell 3 is not discharged, the control process related to the timer 6a is not carried out (flow steps from F113 via F118, F119 to return).

To the contrary, when it is so judged at the step F113 that no external power is supplied to the CD player unit 4, the secondary cell 3 is used as the power source of the CD player unit 4. Namely, the secondary cell 3 is discharged.

Thus, a detection is made as to whether or not the secondary cell 3 is in a discharged state based on the condition of the port Pf of the system controller 6. If the secondary cell is in the discharged state, the control process is advanced to a step F117 at which the count value CTM of the timer 6a is set to 70000h.

If the secondary cell 3 is not fully discharged but is continuously discharged, then the count value CTM of the timer 6a is decremented by two count values at the step F115. For example, when the count value CTM of the timer 6a is equal to 75506h, the count value is set to 75504h.

It should be noted that when as a result of this decrement, the resultant count value CTM becomes 6FFFEh smaller than 70000h, the count value of the timer 6a is reset to 70000h.

When the count value of the timer 6a is decremented or reset, no recharging operation is carried out, and the control process is accomplished under such a condition that the recharging flag $F_{CHG}$ is turned OFF (flow steps from F118 via F119 to return).

As described above, while the CD player unit 4 is operated by employing the secondary cell 3 as the power source, since the cont value CTM of the timer 6a is decremented, the count value CTM of the timer 6a becomes a value corresponding to the operation time thereof at the time instant when the reproducing operation of the CD player unit 4 is stopped.

When the operation of the CD player unit 4 is completed, the control process is advanced from the step F103 via F104, F105, F106 to F107. Then, the recharging operation is commenced. This recharging operation time is defined by a time period from the count value of the timer 6a when the recharging operation is commenced until the count value CTM becomes 00000h. That is to say, before the recharging operation is carried out, the count value CTM of the timer 6a is decremented by 2 counts at the step F115. After the recharging operation has been commenced, the count value is incremented by 1 count at the step F110. As a result, the recharging time becomes two times longer than the operation time of the CD player unit 4.

As described above, according to the embodiment of the present invention, the recharging time is set based on the discharge time, so that this recharging time could become the optimum recharging time with respect to the secondary cell 3. For example, even when neither the precise voltage detection of the secondary cell 3, nor the precise temperature/current detections thereof are carried out, such a recharging apparatus with a simple arrangement can be made without overcharge, which are performed in the conventional recharging method. That is, the voltage drop at the terminal. voltage of the secondary cell lower than the peak value by ΔV is detected. It should also be noted that although the recharge time is selected to be twice as long as the discharge time in this embodiment, the recharge time may be properly set by considering the circuit arrangement, the discharging current amount, the recharging current amount, and the capabilities of the secondary cell. The recharge time is not limited to this example.

Furthermore, when the secondary cell is brought into the rechargeable condition, since this secondary cell can be automatically recharged with its full capacity, the user no longer need pay his attention to the recharge time, and also is not required to turn ON/OFF the recharging apparatus.

In the above-described recharging apparatus, when the recharging operation is started, a detection is made at the step F106 as to whether or not the count value CFM of the timer 6a is larger than, or equal to F8000h. If the count value is larger than, or equal to F8000h, then the recharging operation is not commenced (flow steps from F106 via F118, F119 to return).

The count value CTM of the timer 6a is such a recharging amount corresponding to 170 minutes within the recharge time period between 0 and 180 minutes. In other words, the secondary cell 3 is not so largely discharged (namely, the recharging operation is completed within 10 minutes). That is, when the recharging operation is performed under such a condition that the count value CTM of the timer 6a is larger than, or equal to F8000h, as previously explained, a so-called "shallow" charge/discharge operation is repeatedly performed. This may damaged the secondary cell 3. However, according to the present invention, such a shallow charge/discharge operation is not performed so as to prevent the lifetime of the secondary cell 3 from being shortened.

An example of the recharging operation realized in accordance with the above-explained recharging control will now be described with reference to FIG. 3.

Figure 3:
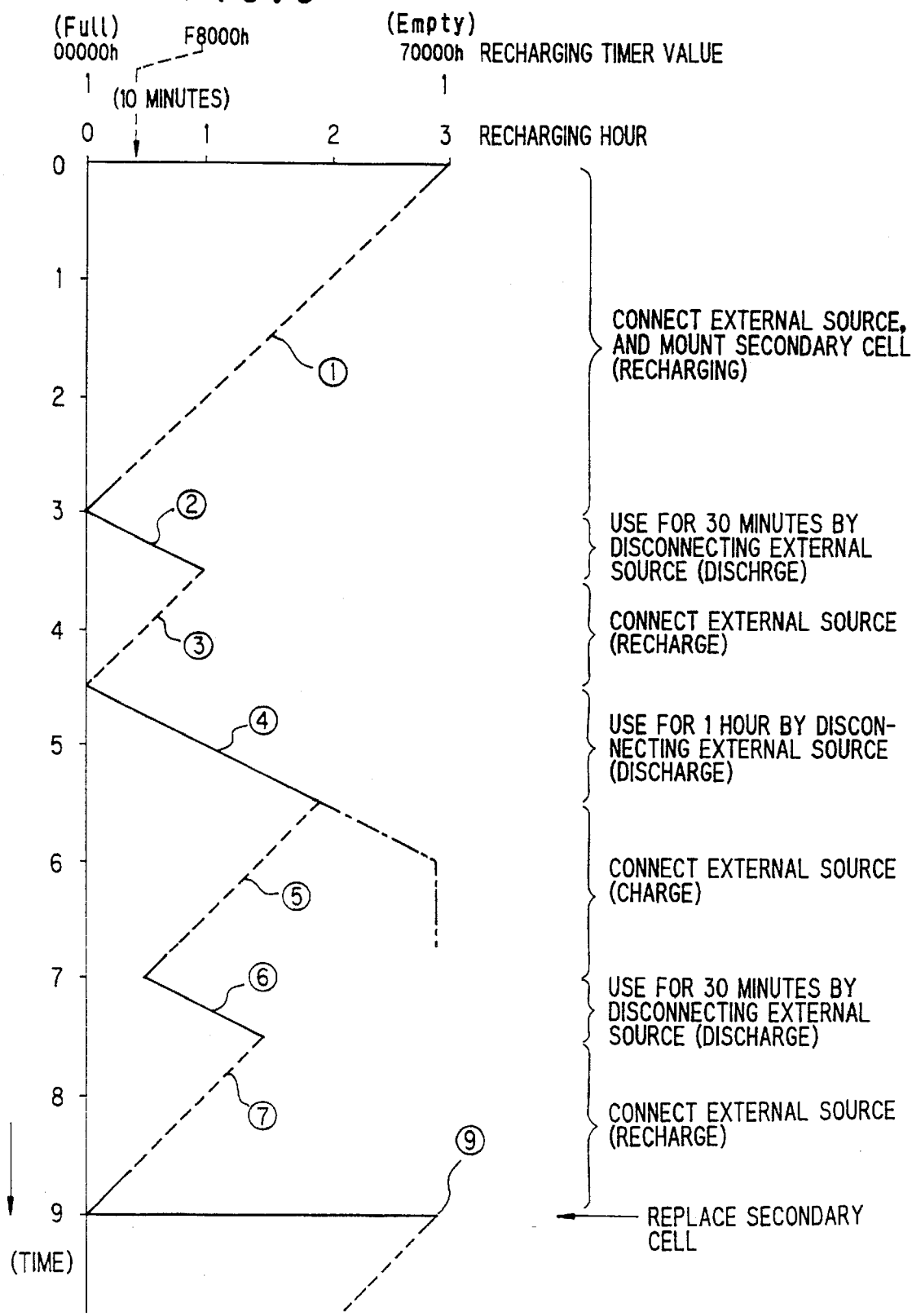
FIG. 3 is an explanatory diagram for describing the recharging operation performed in the recharging apparatus of FIG. 1.

An ordinate of FIG. 3 represents a time lapse, whereas an abscissa thereof indicates the count value (and the corresponding recharging time periods) of the timer 6a.

Assuming now that the secondary cell 3 is mounted and the CD player unit 4 is under a stop state while the AC adaptor is connected to the jack 1 of the external power source, the secondary cell 3 is recharged for 3 hours (1), i.e., until the count value CTM of the timer 6a becomes a value between 70000h and 00000h. In FIG. 3, the increment conditions of the count value TM during the recharging time period are indicated by broken lines.

After 3 hours have passed, assuming now that the AC adaptor is disconnected from the jack 1 and the reproducing operation of the CD player unit 4 is performed for 30 minutes using the secondary cell 3 as the power source, this secondary cell 3 is discharged during this above time period (2), during which the count value CTM of the timer 6a is decremented. In FIG. 3, the decrement state of the count value during the discharge time is indicated by a solid line.

Thereafter, when the reproducing operation is ended and the AC adaptor is connected to the jack 1 of the external power source, the recharging operation is performed for 1 hour during which the count value CTM of the timer 6a is incremented as indicated by the broken line (3).

Furthermore, subsequently, as indicated by (4), after the reproducing operation of the CD player unit 4 is performed for 1 hour and the secondary cell 3 has been discharged, the recharging operation is continued from the count value CTM when this discharge operation is ended until CTM=00000h (5). At this time, if the reproducing operation of the CD player unit 4 is carried out to discharge the secondary cell 3 before the count value of the timer 6a becomes 00000h, the present count value CTM of the timer 6a is decremented (6). Then, the recharging operation to be performed after the completion of the CD player unit 4 is executed from the count value when the operation is ended until CTM=00000h, as shown in (7).

Thereafter, if the present cell is replaced by another secondary cell, then the count value CTM of the timer 6a is reset to 70000h (9).

During the discharge operation as defined at (4), when the reproducing operation of the CD player unit 4 is further continued, the count value CTM of the timer 6a reaches 70000h, as indicated by a dot and dash line. Thereafter, the process operations defined at the steps F116 and F117 of FIG. 2 are executed, so that since the count value CTM of the timer 6a is maintained at 70000h, the secondary cell is not continuously recharged for more than 3 hours. In other words, the upper limit recharging hour is set to 3 hours, whereby the overcharging phenomenon can be also prevented.

It should be understood that when the count value CTM of the timer 6a reaches 70000h, the voltage derived from the secondary cell 3 becomes lower than a preselected voltage. Since such an operation voltage under which the CD player unit 4 can be operated under normal condition cannot be applied, the reproducing operation of this CD player unit 4 is automatically stopped. As a result, it is possible to prevent the secondary cell 3 from being overcharged.

Also, in this embodiment, the voltage detecting circuit 13 is employed, the empty state of the secondary cell 3 is detected at the step F114 of the flow chart of FIG. 2, and then the count value of the timer is reset to 70000h. However, these limitations are not necessarily required, so that the voltage detecting circuit 13 may not be employed.

Alternatively, when the voltage detecting circuit 13 is employed, the cell detection switch 11 for obtaining the reset timing of the count value CTM is no longer required. The count value CTM of the timer may be reset only by detecting the empty condition of the secondary cell 3.

Also, if the employ state of the secondary cell 3 may be detected in response to the extraordinary operation of the CD player unit 4 even when the voltage detecting circuit 13 and the cell detection switch 11 are not employed, this detection may be used as the reset timing. In addition, the secondary cell 3 is continuously discharged until the regular 5 cannot endure to output the power source voltage Vcc to the system controller 6, so that the system controller 6 would be reset. Then, the count value CTM may be reset in response to the resetting operation of the system controller 6.

Furthermore, if the voltage values of the secondary cell 3 are digitalized to be precisely detected by the system controller 6, then more proper recharging operations may be achieved.

In the above-described embodiment, the recharging operation is performed only when the CD player unit 4 is stopped. Alternatively, when the external power source can have sufficient power supply capabilities, the recharging operation may be carried out even if the reproducing operation of the CD player unit 4 is performed by connecting the external power source.

In this case, the above-described formula (1) may be modified under such conditions that the recharging current while the CD player unit 4 is stopped is selected to be $Ic_1$, and the recharging time is $Tc_1$, whereas the recharging current while the CD player unit 4 is reproduced is selected to be $Ic_2$ and the recharging time is $Tc_2$:

$$Tc_1 \times Ic_2 + Tc_2 \times Ic_2 = k \times Td \times Id$$

That is, the recharging current $Ic_2$ is set in accordance with the supply capability of the external power source, and the recharging current is switched by the recharge controlling circuit 10.

In such a case where the recharging current is varied in response to the characteristics of the secondary cell 3 and the recharge controlling circuit 10, and a large error would be produced in the recharging time only by employing one recharging current Ic, more than two sorts of current/time combination may be introduced in the above-mentioned formula (1), namely combinations of the recharging current $Ic_3$ and recharging time $Tc_3$; of the recharging current $Ic_4$ and recharging time $Tc_4$:

$$Tc_3 \times Ic_3 + Tc_4 \times Ic_4 = k \times Td \times Id$$

In this case, for example, based on the count value of the timer 6a, as shown in FIG. 3, the recharging current is selected to be $Ic_3$ during the recharging operation between 0 and 2 hours as to the recharging operation between 0 and 3 hours, whereas the recharging current is selected to be $Ic_4$ during the recharging operation between 2 and 3 hours. Therefore, the recharging time may be set based on the substantially actual current value.

As to the discharge current Id, it may be precisely set in accordance with the operation conditions of the CD player unit 4. For instance, when the output from the CD player unit is muted, the discharge current in case of access is selected to be $Id_1$, and the discharge current during the music reproduction (e.g., when the muted output from the CD player unit 4 is released) is selected to be $Id_2$. Then, the above-described formula (1) may be modified as follows;

$$Tc \times Ic = k_1 \times Td_1 \times Id_1 + k_2 \times Td_2 \times Id_2$$

As a consequence, a more precise discharge amount can be calculated.

Although the present invention has been described as to the recharging apparatus of the embodiment mounted on the CD player, present invention is not limited thereto, but may be applied to other recharging apparatuses. These recharging apparatuses are mounted on various sorts of electronic appliances, e.g., a portable tape recorder equipped with a secondary cell as a power source and a radio receiver including a signal reproducing unit.

What is claimed is:

1. A recharging apparatus for recharging a secondary cell which supplies an operation power supply voltage to a load comprising:

recharging means for recharging the secondary cell;

judging means for judging whether a voltage from the secondary cell is applied to the load;

measuring means for measuring a time period during which the voltage is applied from the secondary cell to the load when a judgement result obtained from said judging means indicates that the voltage from the secondary cell is applied to the load; and control means for setting a recharging time period of said recharging means based on a measured time period of said measuring means and for controlling said recharging means only during said recharging time period, whereby the recharging operation to the secondary cell is carried out by said recharging means, and wherein said control means controls said recharging means so that the recharging operation to the secondary cell is not performed by said recharging means when the measured time period of said measuring means is lower than a predetermined value.

2. A recharging apparatus for recharging a secondary cell which supplies an operation power supply voltage to a load comprising:

recharging means for recharging the secondary cell;

judging means for judging whether a voltage from the secondary cell is applied to the load;

measuring means for measuring a time period during which the voltage is applied from the secondary cell to the load when a judgement result obtained from said judging means indicates that the voltage from the secondary cell is applied to the load; and control means for setting a recharging time period of said recharging means based on a measured time period of said measuring means and for controlling said recharging means only during said recharging time period, whereby the recharging operation to the secondary cell is carried out by said recharging means, wherein said control means sets a maximum recharging time $Tc_{MAX}$ to the secondary cell by said recharging means based on the following formula:

$$T_{CMAX} = A \cdot (n/100) \cdot (1/T_c),$$

where symbol A indicates a capacity of the secondary cell, symbol n shows a maximum recharging amount of the secondary cell indicated by %, and symbol $I_c$ denotes an averaged recharging current during the recharging operation.

3. A recharging apparatus as claimed in claim 1 wherein said control means sets the recharging time period $T_c$ for the secondary cell by said recharging means based on the measurement result obtained from said measuring means in accordance with the following formula:

$$T_c = (k \cdot I_d / I_c) \cdot T_d,$$

where symbol $I_d$ is an averaged discharge current during the load operation, symbol $I_c$ shows an averaged recharging current during the recharging operation, symbol $I_d$ denotes the measured time period for applying the operation voltage from the secondary cell to the load, and k is a coefficient for absorbing fluctuations in a recharging efficiency of the secondary cell in $I_d$, and in $I_c$.

4. A recharging apparatus as claimed in claim 1 further comprising detecting means connected to said control means for detecting whether the secondary cell is mounted on said recharging apparatus, and said control means controls an operation of said recharging means based on a detection signal derived from the detecting means.

5. A recharging apparatus as claimed in claim 1 wherein said recharging means further comprises a voltage detecting circuit connected to said control means for detecting the voltage of the secondary cell, and said control means controls said recharging means to recharge said secondary cell when a detection result from said voltage detecting circuit indicates the voltage of the secondary cell is lower than a predetermined voltage.

6. An electronic appliance operable using either an external power source or a secondary cell as a power source, comprising:

signal reproducing means to which an operation voltage is applied from either the external power source or the secondary cell;

recharging means to which the voltage is applied from said external power source to thereby recharge the secondary cell;

judging means for judging whether the voltage from the secondary cell is applied to said signal reproducing means;

measuring means for measuring a time period during which the voltage from the secondary cell is supplied to said signal reproducing means when a judgement of said judging means indicates the voltage from the secondary cell is supplied to said signal processing means; and control means for setting a recharging time period based on the time period from said measuring means when said signal reproducing means is under a non-operation state, and for controlling said recharging means to recharge the secondary cell only during the recharging time period, whereby the recharging operation to the secondary cell is carried out by said recharging means, wherein said control means controls said recharging means so that the recharging operation to the secondary cell is not performed by said recharging means when the time period from said measuring means is lower than a predetermined value.

7. An electronic appliance as claimed in claim 6 wherein said control means judges whether said external power source is connected to said electronic appliance and causes said recharging means to perform a recharging operation to the secondary cell when the external power source is connected to said electronic appliance, and further wherein a judgement result from said judging means indicates the voltage from the secondary cell is not applied to said signal processing means.

8. An electronic appliance as claimed in claim 7 wherein said control means controls said recharging means to prevent the recharging operation to the secondary cell when the operation power source voltage is supplied from the external power source to said signal reproducing means.

9. An electronic appliance operable using either an external power source or a secondary cell as a power source, comprising:

signal reproducing means to which an operation voltage is applied from either the external power source or the secondary cell;

recharging means to which the voltage is applied from said external power source to thereby recharge the secondary cell;

judging means for judging whether the voltage from the secondary cell is applied to said signal reproducing means;

measuring means for measuring a time period during which the voltage from the secondary cell is supplied to said signal reproducing means when a judgement of said judging means indicates the voltage from the secondary cell is supplied to said signal processing means; and control means for setting a recharging time period based on the time period from said measuring means when said signal reproducing means is under a non-operation state, and for controlling said recharging means to recharge the secondary cell only during the recharging time period, whereby the recharging operation to the secondary cell is carried out by said recharging means, wherein said control means sets a maximum recharging time $T_{CMAX}$ to the secondary cell by said recharging means based on the following formula:

$$T_{CMAX} = A \cdot (n/100) \cdot (1/I_c),$$

where symbol A indicates a capacity of the secondary cell, symbol n shows a maximum recharging amount of the secondary cell indicated by %, and symbol $I_c$ denotes an averaged recharging current during the recharging operation.

10. An electronic appliance as claimed in claim 6 wherein said control means sets the recharging time period $T_c$ for the secondary cell by said recharging means based on the measurement result obtained from said measuring means in accordance with the following formula:

$$T_c = ((k \cdot I_d)/I_c) \cdot T_d,$$

where symbol $I_d$ is an averaged discharge current during the load operation, symbol $I_c$ shows an averaged recharging current during the recharging operation, symbol $T_d$ denotes the measured time period for applying the operation voltage from the secondary cell to the load, and k denotes a coefficient for absorbing fluctuations in a recharging efficiency of the secondary cell, in $I_d$, and in $I_c$.

11. An electronic appliance as claimed in claim 6 further comprising detecting means for detecting whether the secondary cell is mounted on said recharging apparatus, and said control means controls the operation of said recharging means based on a detection signal from the detecting means.

12. An electronic appliance as claimed in claim 6 further comprising a voltage detecting circuit for detecting the voltage of the secondary cell, and said control means controls said recharging means to recharge said secondary cell when a detection result from said voltage detecting circuit indicates the voltage of the secondary cell is lower than a predetermined voltage.

13. An electronic appliance as claimed in claim 6 wherein said signal reproducing means includes a display unit, and information indicative of a recharging condition is displayed on said display unit in response to a control signal from said control means.

14. A recharging method for recharging a secondary cell which supplies an operation power source voltage to a load comprising the steps of:

judging whether a voltage from the secondary cell is applied to the load;

measuring a time period during which the voltage is applied from the secondary cell to the load when a judgment result obtained from said step of judging indicates that the voltage from the secondary cell is applied to the load; and setting a recharging time period based on the time period from said step of measuring and performing the recharging operation of the secondary cell only during said time period so that no voltage is applied from the secondary cell to the load and the secondary cell is recharged, wherein the recharging operation to the secondary cell is not performed when the time period obtained in said step of measuring is lower than a predetermined value.

15. A recharging method for recharging a secondary cell which supplies an operation power source voltage to a load comprising the steps of:

judging whether a voltage from the secondary cell is applied to the load;

measuring a time period during which the voltage is applied from the secondary cell to the load when a judgment result obtained from said step of judging indicates that the voltage from the secondary cell is applied to the load; and setting a recharging time period based on the time period from said step of measuring and performing the recharging operation of the secondary cell only during said time period so that no voltage is applied from the secondary cell to the load and the secondary cell is recharged, wherein said recharging method sets a maximum recharging time $T_{CMAX}$ to the secondary cell by said recharging means based on the following formula:

$$T_{CMAX} = A \cdot (n/100) \cdot (1/I_c),$$

where symbol A indicates a capacity of the secondary cell, symbol n shows a maximum recharging amount of the secondary cell indicated by %, and symbol $I_c$ denotes an averaged recharging current during the recharging operation.

16. A recharging method as claimed in claim 14 wherein said recharging method sets the recharging time period $T_c$ for the secondary cell by said recharging means based on the measurement result obtained from said measuring means in accordance with the following formula:

$$T_c = ((k \cdot I_d)/I_c) \cdot T_d,$$

where symbol $I_d$ is an averaged discharge current during the load operation, symbol $I_c$ shows an averaged recharging current during the recharging operation, symbol $T_d$ denotes the measured time period for applying the operation voltage from the secondary cell to the load, and k denotes a coefficient for absorbing fluctuations in a recharging efficiency of the secondary cell, in $I_d$, and in $I_c$.

* * * * *

UNITED STATES PATENT AND TRADEMARK OFFICE
CERTIFICATE OF CORRECTION

PATENT NO. : 5,631,541
DATED : May 20, 1997
INVENTOR(S) : Kenichi Kabasawa, Lau S. Keang, Looi T. Chung and Shigeho Ogawa It is certified that error appears in the above-identified patent and that said Letters Patent is hereby corrected as shown below:

Col.4, line 30, change "(1/Tc)" to --(1/Ic)--
    line 45, change "operaLion" to --operation--
Col.6, line 22, change "PF" to --Pf--
    line 58, change "timne" to --time--
Col.7, line 10, after "not" delete "."
Col.9, line 10, change "nelther" to-- neither--
    line 16, after "terminal" delete "."
    line 31, change "CFM" to--CTM--
Col.11, line 15, change "$Ic_2$" first occurrence, to --$Ic_1$--

In the claims:
Col.12, line 39, change "(1/Tc)" to --(1/Ic)--

Signed and Sealed this

Twenty-third Day of June, 1998

BRUCE LEHMAN

Attest:

Attesting Officer     Commissioner of Patents and Trademarks